United States Patent [19]

Estaque

[11] 4,058,029
[45] Nov. 15, 1977

[54] TRANSMISSION-REGULATING DEVICE FOR MOTOR VEHICLE

[75] Inventor: André F. Estaque, Bagneux, France

[73] Assignee: Societe Anonyme Automobiles Citroen, Paris, France

[21] Appl. No.: 709,420

[22] Filed: July 28, 1976

[30] Foreign Application Priority Data

July 30, 1975 France .................... 75.23740

[51] Int. Cl.² ............... B60K 41/18; G05G 21/00
[52] U.S. Cl. .................................. 74/865; 74/870
[58] Field of Search ............. 74/861, 865, 870, 871

[56] References Cited

U.S. PATENT DOCUMENTS

| | | | |
|---|---|---|---|
| 2,008,231 | 7/1935 | Vincent | 74/865 X |
| 2,599,387 | 6/1952 | Hefel | 74/865 |
| 2,603,037 | 7/1952 | Forman | 74/870 X |
| 3,027,777 | 4/1962 | Claudon | 74/861 |
| 3,727,487 | 4/1973 | Forster et al. | 74/865 |

Primary Examiner—Samuel Scott
Assistant Examiner—Lance W. Chandler
Attorney, Agent, or Firm—Poms, Smith, Lande & Glenny

[57] ABSTRACT

A device for regulating the transmission of a vehicle incorporating a speed variator and a reverse gear has a hydraulic regulating member and an electrically operated valve disposed in a discharge conduit of the member. Two parallel normally open arms of the energizing circuit of the valve may be closed by two switches respectively operated by a member connected to the accelerator of the vehicle and by a member connected to the reversing gear, energization of the electrically operated valve leading to an interruption of the discharge conduit of the device.

3 Claims, 2 Drawing Figures

TRANSMISSION-REGULATING DEVICE FOR MOTOR VEHICLE

FIELD OF THE INVENTION

This invention relates to a device for regulating the operation of the transmission of a motor vehicle having a variator which includes a step-down control element.

In motor vehicles, in which the transmission incorporates a variator, the position of the variator or of at least one of its elements, and therefore the step-down of the variator, may be made subject to the position of the acceleration control and to the value of the engine speed.

This control arrangement which is generally hydraulic is effected by means of a receiver consisting of a cylinder and a piston adapted for movement in respect of the cylinder and connected to the variator stepdown control element. The piston is subject to the action of a pressurized fluid, the admission of which into a chamber defined in the cylinder and the discharge of which from the chamber are controlled by a distributor. This distributor is subject to the opposing actions of a centrifugal regulator attached to a rotary member in the engine and a flexible member e.g. a spring, the tension of which depends upon the degree of depression of the acceleration control means of the vehicle. As a function of the predominance of one or other of these effects respectively or dependent upon their balance, so the distributor opens the inlet to or the discharge from the chamber or isolates this latter from the source of fluid and from the reservoir.

Generally, the inlet of pressurised fluid into the cylinder gives rise to a displacement of the step-down control element of the variator in the sense of producing a greater degree of speed reduction. The variator likewise, comprises an internal restoring means which endeavours to restore the said control element to its position of slight gear reduction.

One of the disadvantages of these devices is that, under the effect of the internal restoring means of the variator, the control element tends to return to its position of low speed reduction when the means controlling the acceleration of the vehicle is released. Indeed, by releasing this acceleration control means, the effect of the elastic member is diminished and the effect of the centrifugal regulator becomes predominant, resulting in a change in the position of the step-down control element of the variator in terms of producing a low speed reduction.

This arrangement results in annoyance in driving, particularly in town when the accelerator is frequently released, although the driver at the same time needs to have considerable step-down facility in order to be sure of a good "pick up" of the vehicle. The capacity of the vehicle to "pick up" is adversely affected by the fact that the control element of the variator tends to move towards its position of low speed reduction when the accelerator is not being operated.

Furthermore, in these arrangements, there is no provision for a speed limitation when the reversing gear of the transmission is in its reverse travel position, such limitation being required for reasons of safety in driving.

It is an object of the present invention to remedy or reduce these drawbacks by providing a device for regulating the transmission of a vehicle and employing in a simple manner means of improving enjoyment of driving the vehicle in town and the safety with which it can be driven in reverse.

BRIEF DESCRIPTION OF THE INVENTION

According to the present invention there is provided a device for regulating the operation of the transmission of a motor vehicle having a speed reversing gear associated with a speed variator which includes a step-down control element, said device comprising a member tending to maintain said element in its position of low speed reduction, a hydraulic receiver, an element movable in said receiver to define therewith a chamber, means connecting said movable element with the step-down control element of the variator, distributor means associated with said receiver, a source of pressure fluid, a reservoir for pressure fluid, first conduit means adapted to communicate said chamber through said distributor means with said source, second conduit means adapted to communicate said chamber through said distributor means with said reservoir, a centrifugal regulator movable in response to engine speed, connecting means associating the distributor means with the centrifugal regulator, resilient means associated with said connecting means, means for controlling said resilient means in response to operation of an accelerator for said engine, said centrifugal regulator, said resilient means and said control means serving to establish three positions for said distributor means, in the first of which the effect of the resilient means predominates and communication is established between said chamber and said source through said first conduit means while preventing communication between said chamber and said reservoir through said second conduit means, in the second of which the effect of said centrifugal regulator predominates and communication is established between said chamber and said reservoir through said second conduit means while preventing communication between said chamber and said source through said first conduit means, and in the third of which the effects of the resilient means and the centrifugal regulator are in equilibrium and communication is prevented between said chamber and both said source and said reservoir, a two-position electrically operable valve in said second conduit means and having a normally open position permitting flow through said second conduit means, an energising circuit for said valve, switch means normally holding said energising circuit open, an element for closing said switch means, an accelerator for said engine and means connecting said element to said accelerator so that said element is arranged to close said switch means when said accelerator is in a position of rest.

In one embodiment, an element connected to the aforesaid direction reversing gear is provided for closing the switch means when reversing gear is in its position for reverse travel of the vehicle.

In another embodiment, a second energising circuit is provided in parallel with the first mentioned energising circuit and has second normally open switch means closable by a member connected to reversing gear, when the latter is in its position for reverse travel of the vehicle.

DETAILED DESCRIPTION OF INVENTION WITH REFERENCE TO DRAWINGS

Figure 1:
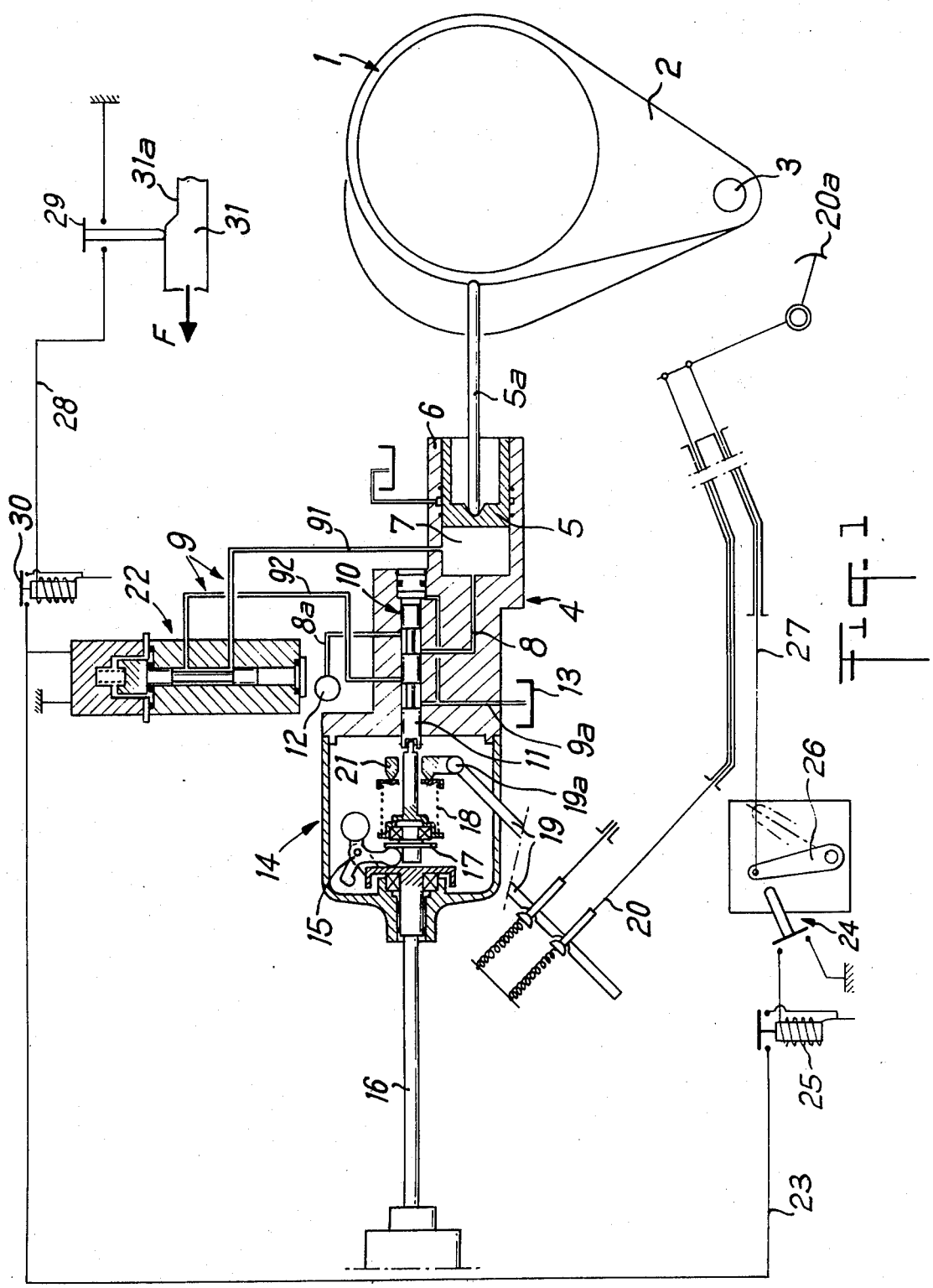
Figure 2:
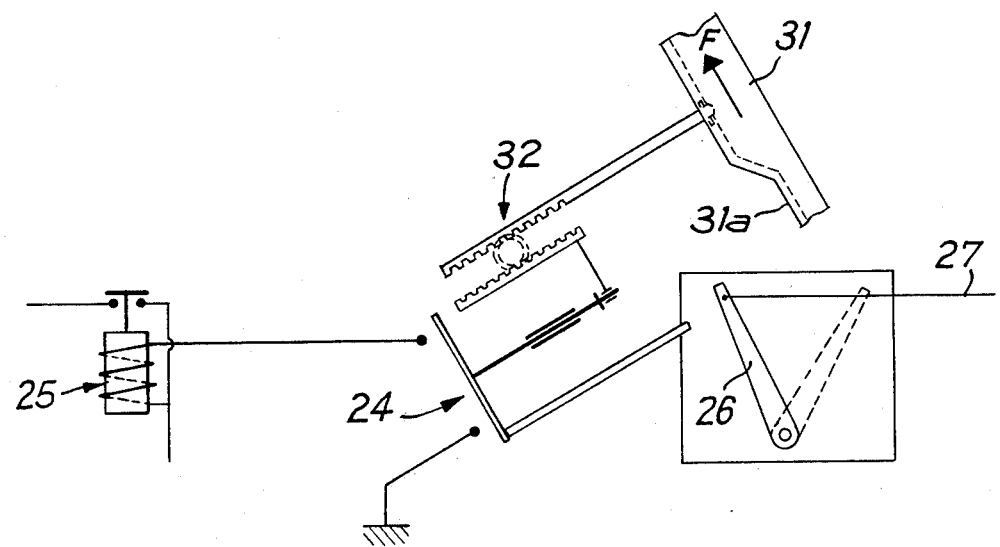

In order to enable the invention to be more readily understood, reference will now be made to the accompanying drawings, which illustrate diagrammatically and by way of example two embodiments thereof and in which, FIG. 1 is a part-sectional diagram of one embodiment of a device for regulating the operation of the transmission of a motor vehicle, and FIG. 2 is a view of part of an alternative embodiment of the device shown in FIG. 1.

With reference to FIG. 1 there is shown a variator input device 1, referred to as a primary rotor, which is mounted on a rocker 2 adapted to rotate about an arbor 3 so that it constitutes the step-down control element of the variator.

Ths arbor is movable to the left in FIG. 1 by a restoring means known per se (not shown) and to the right in FIG. 1 by a regulating device 4. This regulating device 4 consists of a hydraulic receiver comprising a movable element or piston 5, the rod 5a of which is connected to the rocker 2 and is adapted to slide in a fixed cylinder 6. The piston 5 and cylinder 6 thus define chamber 7 into which lead a first conduit 8 for the inlet of a pressurised fluid and a second conduit 9 for the discharge of this fluid. A distributor 10 having a three-position slide valve 11 is arranged to control the fluid flows in the conduits 8 and 9. In a first position of the slide valve, the distributor establishes communication between the conduit 8 and a conduit 8a which serves for the inlet of pressurised fluid and which is itself connected to a source 12, and isolates the conduit 9 from a discharge conduit 9a which is arranged to discharge into a reservoir 13. In a second position, the slide valve of the distributor establishes communication between the aforesaid conduits 9 and 9a, and isolates the conduit 8 from the conduit 8a. Finally, in a third position of the slide valve, the distributor simultaneously isolates the conduits 8 and 9 from the conduits 8a and 9a.

One end of the slide valve 11 is connected to an element 14 for controlling its movement, this element 14 comprising a centrifugal regulator 15 which is caused to rotate about an arbor 16 by which is itself connected in known manner to the cam shaft of the engine. This regulator is in contact with a plate 17 which is rigid for translatory movement with the slide valve 11. The element 14 also comprises a resilient device e.g. a spring 18 which likewise bears on the plate 17 and the effect of which opposes that of the regulator 15. The tension in the spring 18 is dependent upon the angle of inclination of a lever 19 which, under the effect of a traction cable 20 connected to the accelerator pedal of the vehicle 20a, can be pivoted about a fixed point 19a and which, through a plate 21, compresses the spring 18 to a greater or lesser degree.

The conduit 9 is divided into two portions 91 and 92 by a two-position electrically operated valve 22. In its non-energised position, which is the position shown in FIG. 1, this valve maintains communication between the said portions 91 and 92. In its energised position, however, it breaks this communication.

The circuit for energising this electrically operated valve has a first section 23 comprising in series a make-and-break switch 24 and a closure relay 25. The switch 24 is capable of being closed by a control element 25 of the carburettor of the vehicle, shown symbolically as a pivoting lever connected to the accelerator pedal 20a by means of a cable 27. The switch 24 is closed only when no action is being exerted on the pedal 20a, thanks to the effect of means (not shown) for restoring the lever 26 to its position of rest.

The energising circuit of the electrically operated valve 22 has a second section 28 disposed in parallel with the first and comprising a switch 29 in series with a relay 30 for opening and closing the said second section. The switch 19 co-operates with a member 31 connected in per se known manner to the reversing gear incorporated in the transmission of the vehicle, the member 31 preferably being a rod for the manual operation of the reversing gear selector and comprising at least one flat face 31a which is positioned opposite the switch 29 when the position of the rod corresponds to reverse movement of the vehicle.

In the alternative embodiment shown in FIG. 2 in which the parts not shown are the same as the parts shown in FIG. 1, everything is tantamount to saying that the switch 29 could be confused with the switch 24. In a first stage, when the accelerator pedal is at rest, the switch 24 is closed by the member 26; in a second stage, when the driver is engaging reverse gear, the rod 31 likewise closes this switch by the linkage means shown at 32 and independently of the member 26; finally, in a third stage, when the driver depresses the accelerator pedal, the member 26 ceases to act but the switch 24 remains closed by reason of the linkage 32. The electrically operated valve 22 remains energised therefore, so preventing the escape of fluid from the cylinder 6 and consequently the rocker 2 remains in its position of high speed reduction of the variator.

In operation, when the effect of the lever 19 predominates over that of the centrifugal regulator 15, that is to say when the driver is causing the vehicle to accelerate, or when the load on the vehicle is increasing, for example on an upward gradient, the engine speed diminishes, the slide valve 11 of the distributor 10 is pulled to the left (FIG. 1) and communication is established between the conduits 8 and 8a while the conduit 9 is isolated from the conduit 9a. There is therefore an intake of pressurised fluid into the chamber 7, the piston 5 is therefore moved to the right and pushes the rocker 2 in the direction of greater speed reduction.

In response, the engine speed increases and, turning more rapidly, the regulator 15 counterbalances the effect of the lever 19 until equilibrium is established. The slide valve 11 is then in a neutral position, signifying the fact that the chamber 7 is isolated from both the intake and from the discharge, and the rocker 2 is rendered immobile.

If, however, the driver somewhat relaxes the accelerator pedal or if the load on the engine diminishes, for example on a downward gradient in the road which is being followed by the vehicle, it is the effect of the regulator 15 which predominates and the slide valve 11 is pushed to the right, that is to say to a position in which the chamber 7 is connected to the discharge. Under the effect of the restoring means incorporated in the rocker 20, this latter resumes a position of lower speed reduction since the piston 5 no longer encounters any resistance due to the fluid enclosed in the chamber 7. The engine speed decreases until equilibrium is again established in respect of the slide valve 11.

Finally, the driver of the vehicle may be induced fully to lift his foot from the pedal 20a. As stated hereinabove, the variator then tends to resume a position of low speed reduction. At the same time, the lever 26 closes the switch 24 which, through the relay 25, closes the arm 23 of the circuit which energises the electrically operated valve 22. This latter then takes up its position of closure of the conduit 9 and prevents any discharge of fluid from the chamber 7. The rocker 2 is then immobilised in the position which it occupied immediately prior to cessation of the action of the driver on the pedal 20a. This arrangement is particularly interesting in the case of a vehicle which is being driven in town. Indeed, by virtue of the low speed of the vehicle under these traffic conditions, the rocker is in the zone of high speed reduction. When the accelerator is no longer biased by the driver, the rocker 2 is immobilised in the zone. Thus, at the next acceleration operation, it takes less time for the rocker to assume the position corresponding to the acceleration desired by the driver through the pedal 20a than if the rocker 2 were compelled to return to its position of low speed reduction. By saving on the response time of the device, the "pick up" of the vehicle is improved so that town driving becomes more agreeable.

When the vehicle is stationary and the engine is rotating at less than a given speed, it will be noted that by its construction, in manner known per se, the regulating element 14 is such that the slide valve 11 is in the position to permit the supply of pressure fluid to the cylinder 6 and consequently the rocker 2 is in its position of greatest speed reduction. It is desirable for the rocker 2 to remain in this position when, having engaged reverse gear, the driver presses the accelerator pedal, in order that the vehicle cannot travel at too high a speed while it is in reverse. Let it be assumed then that the driver is operating the reverse gear of the vehicle through the reverse gear mechanism and in particular its control rod 31 which is moved in the direction of the arrow F (FIG. 1). It will be seen that the flat 31a on this control rod is positioned opposite the push member of the switch 29 which lowers and becomes closed. Thus, the relay 30 is energised, closing the second arm 28 of the circuit which energises the electrically operated valve 22. This latter then occupies its position of occlusion of the conduit 9, isolating the portions 91 and 92 from each other. The chamber 7 can no longer be brought into communication with the reservoir 13 despite the slide valve 11 of the distributor 10 being in a position which allows it. The rocker 2 is consequently immobilised in the position in which the variator produces a high speed reduction. Whatever action the driver exerts on the pedal 20a, there will be no possible variation in the step-down ratio. Thus, it is possible to restrict the speed which the vehicle can attain while in reverse.

It will be seen that the present device makes it possible easily and by using just one electrically operated valve to prevent the variator returning to its condition of low speed reduction when the accelerator pedal is not operated and furthermore makes it possible to provide a safety function, limiting the speed which the vehicle can adopt while in reverse.

What is claimed is:

1. A device for regulating the operation of the transmission of a motor vehicle having a speed reversing gear associated with a speed variator which includes a step-down control element, said device comprising a member tending to maintain said element in its position of low speed reduction, a hydraulic receiver, an element movable in said receiver to define therewith a chamber, means connecting said movable element with the step-down control element of the variator, distributor means associated with said receiver, a source of pressure fluid, a reservoir for pressure fluid, first conduit means adapted to communicate said chamber through said distributor means with said source, second conduit means adapted to communicate said chamber through said distributor means with said reservoir, a centrifugal regulator movable in response to engine speed, connecting means associating the distributor means with the centrifugal regulator, resilient means associated with said connecting means, means for controlling said resilient means in response to operation of an accelerator for said engine, said centrifugal regulator, said resilient means and said control means serving to establish three positions for said distributor means, in the first of which the effect of the resilient means predominates and communication is established between said chamber and said source through said first conduit means while preventing communication between said chamber and said reservoir through said second conduit means, in the second of which the effect of said centrifugal regulator predominates and communication is established between said chamber and said reservoir through said second conduit means while preventing communication between said chamber and said source through said first conduit means, and in the third of which the effects of the resilient means and the centrifugal regulator are in equilibrium and communication is prevented between said chamber and both said source and said reservoir, a two-position electrically operable valve in said second conduit means and having a normally open position permitting flow through said second conduit means, an energising circuit for said valve, switch means normally holding said energising circuit open, an element for closing said switch means on accelerator for said engine and means connecting said element to said accelerator so that said element is arranged to close said switch means when said accelerator is in a position of rest.

2. A device as claimed in claim 1, wherein an element connected to said reversing gear is provided for closing said switch means when said reversing gear is in its position for reverse travel of the vehicle.

3. A device as claimed in claim 1, wherein a second energising circuit is provided in parallel with the first-mentioned energising circuit, and has second normally open switch means closable by a member connected to said reversing gear when the latter is in its position for reverse travel of the vehicle.

* * * * *